June 26, 1962  R. S. RAE  3,040,520
JET POWER UNIT FOR AN AIRCRAFT
Filed Nov. 22, 1954
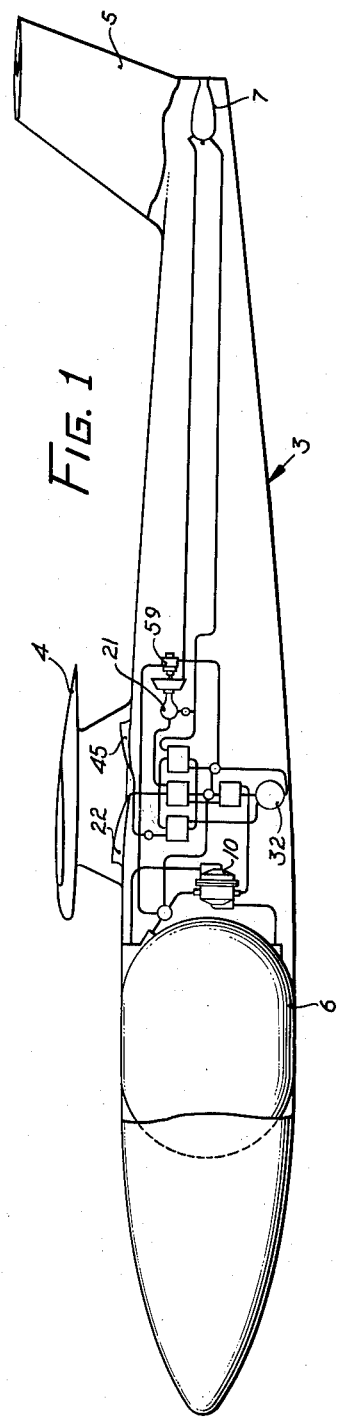
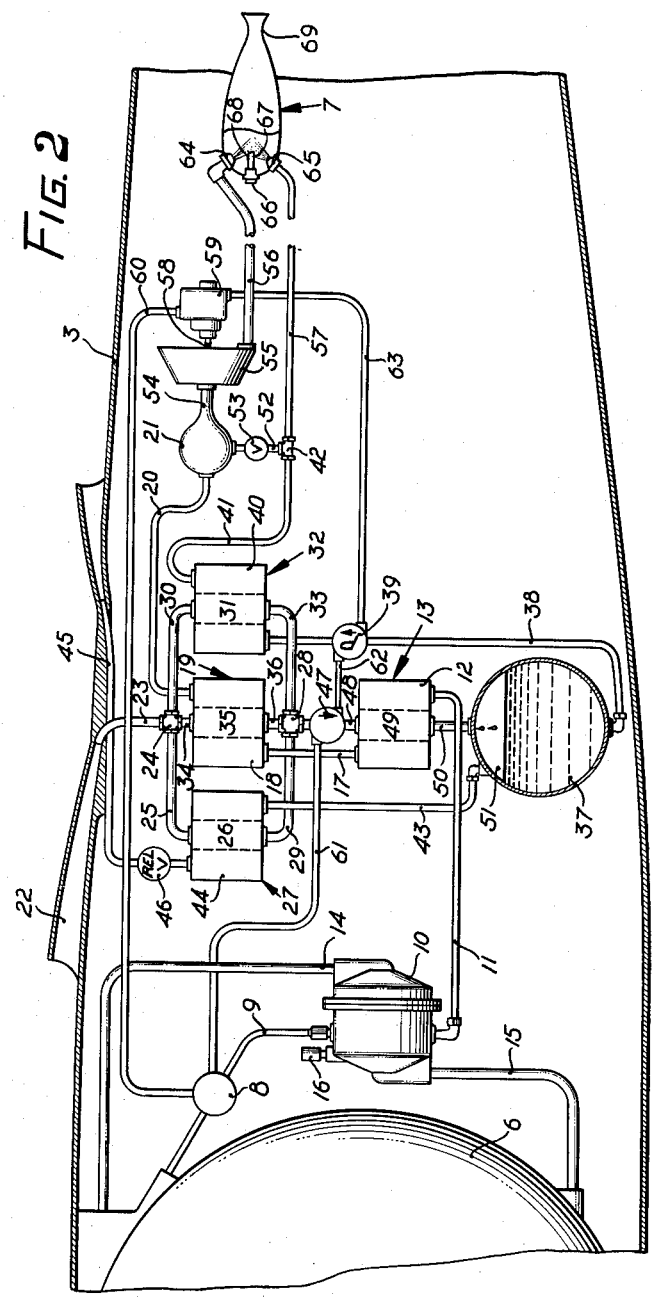
RANDOLPH SAMUEL RAE
INVENTOR.
BY R. E. Geauque
ATTORNEY

3,040,520
JET POWER UNIT FOR AN AIRCRAFT
Randolph Samuel Rae, Santa Monica, Calif., assignor to The Garrett Corporation, Los Angeles, Calif., a corporation of California
Filed Nov. 22, 1954, Ser. No. 470,237
5 Claims. (Cl. 60—35.6)

This invention relates to a jet power unit for an aircraft and more particularly to a non-air breathing jet motor which utilizes separate supplies of low temperature liquid fuel and liquid oxygen carried by the aircraft. The liquid oxygen for the jet motor is continually produced during the flight of the aircraft by liquifying oxygen from atmospheric air so that no more liquid oxygen need be carried by the aircraft than is required for continuous operation of the jet power unit.

In co-pending patent application Serial No. 449,702, filed August 13, 1954, now Patent No. 2,922,286, by Randolph Samuel Rae, there is disclosed means for continually producing liquid oxygen from atmospheric air by utilizing a low temperature liquid fuel, such as hydrogen, in heat exchangers through which the atmospheric air is passed. Also, the atmospheric air is cooled by the oxygen passing to the engine from the liquid oxygen supply and by the cold nitrogen gas resulting from the liquefication of the oxygen. The present invention utilizes the oxygen so produced and the fuel supply in order to propel the aircraft by a jet motor and a regulated portion of the oxygen is combusted with a portion of the fuel prior to entering the jet motor to operate an auxiliary power unit for driving the various pumps and auxiliary equipment required by the engine. This auxiliary power unit can be in the form of a turbine which is positioned in the fuel line and is supplied with high pressure fuel and combustion products from a combustion chamber which ignites the regulated portion of the oxygen with the fuel. The exhaust from the turbine is then ignited with the remaining oxygen in the jet motor to obtain forward thrust. While the invention is particularly useful in connection with the propulsion of a high altitude aircraft, it is understood that the jet power unit can be utilized to propel any craft in an atmosphere where oxygen is present.

It is therefore an object of the present invention to provide a jet power unit for an aircraft which utilizes low temperature liquid fuel carried by the aircraft and low temperature liquid oxygen which is continually produced from atmospheric air.

Another object of the present invention is to provide a jet power unit for an aircraft in which a supply of liquid hydrogen is carried by the aircraft as fuel and a supply of liquid oxygen is continually produced from atmospheric air and in which the oxygen and fuel are combusted in a jet motor to produce forward thrust.

A still further object of the present invention is to provide a jet power unit for an aircraft which ignites fuel and oxygen to obtain forward thrust and in which a portion of the fuel and oxygen is ignited in a combustion chamber to drive an auxiliary power unit.

These and other objects of the invention not specifically set forth above, will become readily apparent from the accompanying description and drawings in which;

FIGURE 1 is a schematic illustration of the invention illustrating the fuel tank and oxygen producing apparatus located within the aircraft fuselage and the jet motor located at the aft end of the aircraft.

FIGURE 2 is a vertical section of the aircraft showing in diagrammatic form the construction of the jet power unit.

Referring to FIGURE 1, an airplane 3 is shown having a wing 4 and a tail surface 5. A storage tank 6 is located forward of the wing 4 and is so formed that a portion of the surface of the tank forms a portion of the surface of the aircraft. The tank 6 is utilized to store the liquid hydrogen as fuel for the engine and it is understood that other low temperature liquid fuels can be utilized in place of hydrogen. The apparatus for producing liquid oxygen from atmospheric air is located underneath the wing 4 and the jet motor 7 is located at the tail end of the aircraft and is connected to the liquid fuel and liquid oxygen supply. A pump 8 is contained in the hydrogen supply line 9 and serves to pump hydrogen from the tank 6 through the heat exchanger 10 and to passage 11 which leads to chamber 12 of heat exchanger 13.

The heat exchanger 10 also receives from passage 14 the hydrogen gases evaporating from the liquid in the tank and these gases are cooled by the heat exchanger 10 and returned to an outer shell (not shown) of the tank through passage 15 for the purpose of continually cooling the liquid hydrogen in the tank.

The heat exchanger 10 has a release valve 16 to prevent the pressure of the evaporated gases from exceeding an allowable limit since gases will be continually added to the cooling cycle by evaporation of the liquid hydrogen. The outer chamber 12 connects through passage 17 with outer chamber 18 of heat exchanger 19 and the outer chamber 18 discharges through passage 20 to a combustion chamber 21. An airscoop 22 takes in a suppy of atmospheric air and this supply is connected through passage 23 to a four-way fitting 24. A portion of the incoming air is directed through passage 25 to inner chamber 26 of heat exchanger 27 and is then discharged to another fitting 28 through a passage 29. Another portion of the incoming air passes from fitting 24 through passage 30 to inner chamber 31 of heat exchanger 32 and then passes to fitting 28 through passage 33. A third portion of incoming air is directed through passage 34 to inner chamber 35 of heat exchanger 19 and this inner chamber is connected to the four-way fitting 28 through passage 36.

The liquid oxygen and cold nitrogen gas resulting from the liquefication process are both collected in a tank 37. The liquid oxygen is withdrawn from the tank 37 through passage 38 by pump 39 and enters the outer chamber 40 of heat exchanger 32 and this outer chamber is exhausted through a passage 41 which leads to a fitting 42. Also, the cold nitrogen gas at the liquefication temperature of the oxygen is directed through passage 43 to the outer chamber 44 of heat exchanger 27 and this outer chamber is connected to atmosphere through a passage 45 which contains a release valve 46. The total incoming air supply arriving at fitting 28 is compressed by compressor 47 contained in a passage 48 which connects the fitting with inner chamber 49 of heat exchanger 13. This inner chamber is connected by a passage 50 to the tank 37 in order to discharge the liquid oxygen and cold nitrogen gas resulting from the liquefication process and the nitrogen gas will collect in the upper portion 51 of the tank.

In operation of the invention, the incoming air is precooled in heat exchanger 19, 27 and 32 to about the liquefication temperature of the oxygen in the air since the cold nitrogen gases entering heat exchanger 27 are at about the liquefication temperature of oxygen and, of course, the oxygen being pumped to heat exchanger 32 is also at about the liquefication temperature of oxygen. In addition, the hydrogen fuel passing from heat exchanger 13 to heat exchanger 19 through passage 17 is at about the liquefication temperature of oxygen since it has been raised to about this temperature in passing through heat exchanger 13. It is also apparent that the hydrogen gas in passage 20 and the oxygen gas in passage 41 will be at about ambient temperature since air enters the heat exchangers 19 and 32 at ambient temperature and also, the nitrogen gas exhausted through passage 45 will be at about ambient temperature. The heat exchanger 13 will remove sufficient heat from the precooled air entering inner chamber 49 to liquify all the oxygen in the air and the liquid oxygen and the remaining nitrogen gas will be discharged to tank 37. The compressor 47 serves to increase the pressure of the precooled air in order to increase the liquefication temperature of the oxygen in the air and this high pressure is maintained in tank 37 by the release valve 46. Thus, at low atmospheric pressures, the liquefication temperature of the oxygen can be increased so that more oxygen can be liquefied with a given amount of liquid fuel.

A passage 52, containing a valve 53, connects the fitting 42 with the combustion chamber 21 and the valve 53 is regulated to supply a portion of the oxygen in passage 42 to the combustion chamber. In the combustion chamber, a portion of the hydrogen fuel received from passage 20 will be combusted with the oxygen to provide a mixture of the hydrogen fuel and combustion products at increased pressure and temperature. The combustion chamber is connected through passage 54 with an auxiliary turbine 55 which is driven by the hydrogen gas and products of combustion from the combustion chamber 21. The turbine 55 exhausts through passage 56 to the jet motor 7 located at the tail end of the aircraft. Also, the oxygen is received by the jet motor 7 from passage 57 which connects with fitting 42. The turbine 55 has an output shaft 58 which is connected to an auxiliary power unit 59 illustrated as a pump. It is understood that other types of power units, such as a generator, can replace the pumps 59. The output of pump 59 is directed through passage 60 to the hydrogen fuel pump 8 and then through passage 61 to the compressor 47. Passage 62 connects the discharge from the compressor to pump 39 in the oxygen passage 38 and return line 63 connects pump 39 with unit 59. Thus, the turbine 55 and pump unit 59 serve to drive the auxiliary power equipment utilized by the power unit and, of course, the output of pump 59 can be connected to other power requirements within the aircraft in the usual well-known manner. The amount of oxygen supplied to combustion chamber 21 will be regulated to combust only enough hydrogen fuel in the chamber to produce the amount of auxiliary power needed within the aircraft.

The fuel passage 56 connects with jet fitting 64 positioned within the jet motor 7 and the oxygen passage 57 connects with jet fitting 65 positioned adjacent the jet fitting 64 so that the jets are directed to mix the fuel and oxygen. An ignition unit 66 is carried by the jet motor and has two spaced electrical contacts 67 and 68 to provide an ignition spark to ignite the mixture of hydrogen and oxygen within the jet motor 7. The exit of the high pressure, high temperature combustion products from the nozzle end 69 of the motor results in a forward thrust being imparted to the aircraft. Sufficient hydrogen and oxygen will be supplied to the jet motor 7 to provide the necessary thrust for the aircraft and more than one such jet motor can be utilized with the same source of hydrogen fuel and oxygen.

From the above description, it is apparent that a jet power unit for an aircraft is provided by the present invention which has sufficient liquid fuel carried by the aircraft to maintain flight for a desired period and the jet unit also comprises apparatus for continually producing liquid oxygen from atmospheric air so that only sufficient liquid oxygen is carried by the aircraft to maintain combustion of the jet engine. Thus, the weight of oxygen carried at any time by the aircraft is substantially less than if sufficient oxygen for the required flight time were stored in the aircraft. By combusting a portion of the fuel with a regulated supply of oxygen prior to supplying the fuel to the jet motor, it is possible to drive auxiliary power means and provide the necessary energy for the auxiliary equipment. As previously stated, the amount of auxiliary power can be controlled by the amount of oxygen admitted to combustion chamber 21 by valve 53, and by combusting the hydrogen and oxygen in the jet motor 7, it is possible to propel the aircraft 3 without depending upon the oxygen in atmospheric air being taken directly into the motor. The present invention can utilize various other arrangements of heat exchangers to produce liquid oxygen from atmospheric air by utilizing the low temperature liquid fuel in tank 6 and other types of liquid storage tanks for the low temperature liquid fuel can also be used. Various other modifications of the invention are contemplated by those skilled in the art without departing from the spirit and scope of the invention as hereinafter defined by the appended claims.

What is claimed is:

1. A power unit for an aircraft comprising a jet engine, a supply of low temperature liquid hydrogen carried by said aircraft for use as fuel for said engine, means carried by said aircraft for producing a supply of liquid oxygen from atmospheric air for use as an oxidant for said fuel, and an air scoop for supplying atmospheric air to said liquid oxygen producing means during flight of said aircraft, said liquid oxygen producing means comprising first heat exchanger means connected directly with said hydrogen supply and with the atmospheric air supplied by said air scoop for liquefying the oxygen in said air and second heat exchanger means for cooling the atmospheric air in three separate parts with three separate cooling mediums prior to entering said first heat exchanger means, said separate cooling mediums comprising the hydrogen discharged from said first heat exchanger means, the nitrogen gas separated from the liquid oxygen in said first heat exchanger means and the liquid oxygen produced by said first heat exchanger means, separate passage means for connecting the hydrogen and oxygen discharged from said second heat exchanger means in gaseous form with said engine, and means for combusting said hydrogen and oxygen within said engine to produce power.

2. A jet power unit for an aircraft comprising a jet motor attached to said aircraft, means carried by said aircraft for storing liquid fuel having a temperature below the liquefication temperature of the oxygen in atmospheric air, scoop means carried by said aircraft for obtaining a supply of atmospheric air, liquefying means supported by said aircraft and operable during flight of said aircraft for liquefying oxygen from said supply of atmospheric air by use of said low temperature fuel and by use of the liquid oxygen and low temperature nitrogen gas resulting from the operation of said liquefying means, said liquefying means comprising three separate heat exchangers connected in parallel with said scoop means and each receiving only a portion of said atmospheric air supply, heat exchanger means connected with each of said heat exchangers for receiving the total atmospheric air supply cooled by said heat exchangers, means for connecting said heat exchanger means with said liquid fuel to liquefy the oxygen in the atmospheric air received by said heat exchanger means, means for supplying each of said heat exchangers with a cooling medium comprising means for connecting one of said heat exchangers with the fuel discharged from said heat exchanger means, another with the liquid oxygen discharged from said heat exchanger means and another with nitrogen gas discharged from said heat exchanger means, means for connecting said fuel and oxygen discharged from said heat exchangers with said jet motor, and means for mixing and igniting said discharged fuel with said discharged oxygen within said motor to produce jet thrust.

3. In an aircraft of the type having a jet engine and a source of liquid fuel below the liquefication temperature of the oxygen in atmospheric air for use in said jet engine:

means for separating and liquefying oxygen from atmospheric air for the combustion of said fuel comprising a group of heat exchangers having air passages and coolant passages, the air passages being connected in parallel relationship and communicating at the inlet ends thereof with the ambient atmosphere to receive air, a second stage heat exchanger having first and second passages, said first passage communicating at the inlet end with the outlet ends of the air passages in the heat exchangers of said group, an oxygen receiver communicating with the outlet end of the first passage in said second stage heat exchanger, means for conducting liquid fuel from said source to the second passage of said second stage heat exchanger and then to the coolant passage of one heat exchanger in said group, such fuel then being conducted to said jet engine, and means for conducting oxygen from said oxygen receiver to the coolant passage of a second heat exchanger of said group and then to said jet engine to support combustion of the fuel supplied thereto.

4. In an aircraft of the type having a jet engine and a source of liquid fuel below the liquefaction temperature of the oxygen in atmospheric air for use in said jet engine: means for separating and liquefying oxygen from atmospheric air for the combustion of said fuel comprising a group of heat exchangers having air passages and coolant passages, the air passages being connected in parallel relationship and communicating at the inlet ends thereof with the ambient atmosphere to receive air therefrom, a second stage heat exchanger having first and second passages, a compressor receiving initially cooled air from the outlet ends of the air passages in the heat exchangers of said group and discharging compressed air into the inlet end of the first passage in said second stage heat exchanger, an oxygen receiver communicating with the outlet end of the first passage in said second stage heat exchanger, means for conducting fuel from said source through the second passage of said second stage heat exchanger and the coolant passage of one heat exchanger of said group to said jet engine, and means for conducting oxygen from said oxygen receiver through the coolant passage of a second heat exchanger of said group and then to said jet engine to support combustion of the fuel supplied thereto.

5. In an aircraft of the type having a jet engine and a source of liquid fuel below the liquefaction temperature of the oxygen in atmospheric air for use in said jet engine, means for separating and liquefying oxygen from atmospheric air for the combustion of said fuel comprising a group of heat exchangers having air passages and coolant passages, the air passages being connected in parallel relationship and communicating at the inlet ends thereof with the ambient atmosphere, a second stage heat exchanger means having first and second passages, said first passage communicating at the inlet end with the outlet ends of the air passages in the heat exchangers of said group, an oxygen storage tank communicating with the outlet end of the first passage in said second stage heat exchanger means, means for conducting liquid fuel from said source to the second passage of said second stage heat exchanger means and then to the coolant passage of one heat exchanger in said group, a power unit having a combustion chamber communicating with and receiving fuel from the coolant passage of said one heat exchanger, means for conducting oxygen from said oxygen storage tank to the coolant passage of a second heat exchanger of said group and then to the combustion chamber of said power unit and jet engine, means for regulating the supply of oxygen to said combustion chamber to combust only a portion of the fuel supplied thereto, and means for conducting the fuel rich exhaust products from said combustion chamber to said jet engine for further combustion with the oxygen supplied thereto.

References Cited in the file of this patent

UNITED STATES PATENTS

| | | |
|---|---|---|
| 2,407,852 | Smith | Sept. 17, 1946 |
| 2,602,289 | Anxionnaz et al. | July 8, 1952 |
| 2,685,180 | Schlitt | Aug. 3, 1954 |

FOREIGN PATENTS

| | | |
|---|---|---|
| 736,486 | Germany | June 18, 1943 |
| 702,779 | Great Britain | Jan. 20, 1954 |

OTHER REFERENCES

Bulletin of American Interplanetary Society, No. 16, February 1932, page 9.